April 21, 1964  MITSUO MIZUNO  3,129,477
MAGNETIC CLASP
Filed June 21, 1962
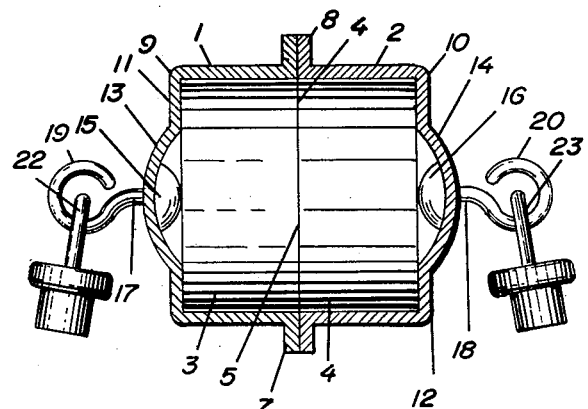
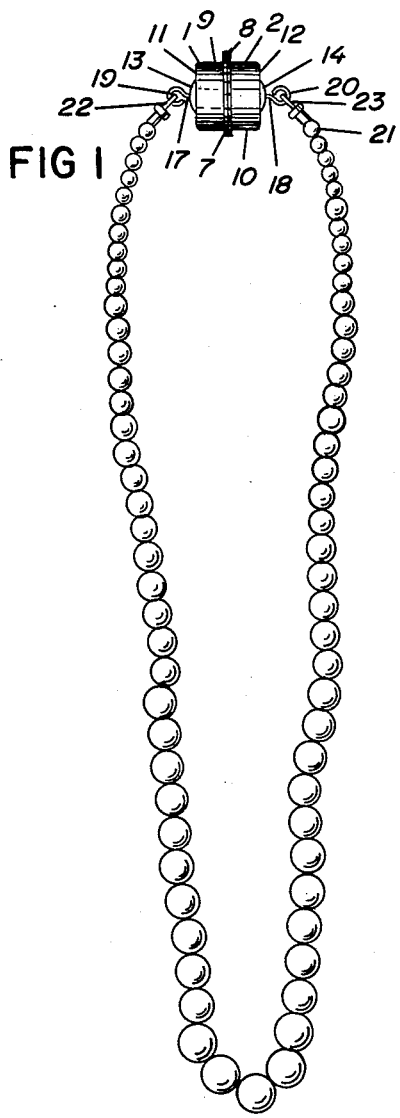
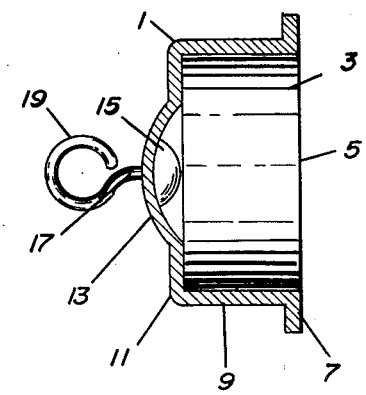
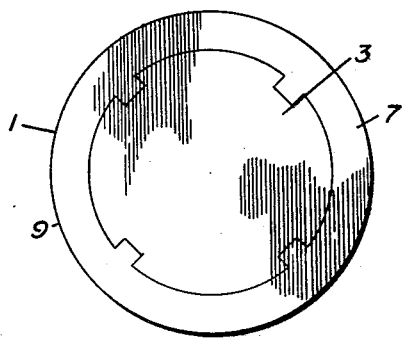
Mitsuo Mizuno
INVENTOR
BY Wenderoth, Lind & Ponack
ATTORNEYS United States Patent Office 3,129,477
Patented Apr. 21, 1964

3,129,477
MAGNETIC CLASP
Mitsuo Mizuno, Osaka, Japan, assignor to New
Kyoei Incorporation, Osaka, Japan
Filed June 21, 1962, Ser. No. 204,175
2 Claims. (Cl. 24—201)

The present invention relates to a joining device in personal ornaments. More particularly, it relates to a joining device which consists of a pair of twin permanent magnet pieces secured in a pair of twin holders in such a manner that the brim of each holder is on the same plane with the surface of the magnet piece held therein, and an engaging member is loosely mounted in the center of the back of each holder and is engaged with an engaging member of a personal ornament such as a necklace or a bracelet. A pair of the above-described joining parts can be coupled or separated at will by means of the permanent magnet.

The conventional joining devices in personal ornaments are almost always of hook or screw type. They are not so fine in appearance. And it may be so troublesome to put a necklace joined at the back of one's neck that she will sometimes give up to put it on in a hurried time. Accordingly, such a troublesomeness will invite rough handling and early failure in the joining part.

The present invention has overcome the above mentioned faults. In the present invention, a pair of joining parts provided at the ends of an ornament will be joined pretty firmly if only brought to meet together, and they will be separated easily if only pulled enough.

FIG. 1 is a front view showing an embodiment of the present invention. FIG. 2 is a vertical section in the joining part of FIG. 1. FIG. 3 is a side view of the joining part. And FIG. 4 is an enlarged sectional view of FIG. 2.

In the drawing which shows an embodiment of the present invention, coin-like pieces 3, 4 of permanent magnet are secured in twin metallic holders 1, 2 which are designed to be ornamental in appearance and to be U-letter-shaped in vertical section. The surfaces 5, 6 of magnet pieces 3, 4 are on the same planes with the brims 7, 8 of holders 1, 2 respectively. These magnet pieces and holders form a pair of joining parts 9, 10. Hollows 13, 14 are provided centrally at the backs of joining parts 9, 10 respectively. Engaging members 19, 20 are provided to connect the holders 1, 2 and the engaging members 22, 23 being at the ends of a necklace 21. The heads 15, 16 of engaging members 19, 20 are held in the hollows 13, 14, and the middle parts 17, 18 of 19, 20 go through the ports of hollows 13, 14, and the feed of 19, 20 form hooks to engage with the engaging members of necklace.

In the present invention, as above described, the permanent magnet pieces 3, 4 have flat surfaces 5, 6 which are on the same planes with the brims 7, 8 of the holders 1, 2. This feature enables the pair of permanent magnet pieces to attract and join each other pretty firmly, and in addition, the joining parts are joined so integrally that they look as an ornamental member of the necklace. A large ornamental circle is formed with the joining parts 9, 10, the engaging members 19, 20 held at the hollows 13, 14 of 9, 10, the engaging members 23, 24 of necklace, and the necklace 21. And the ornamental circle is not easily broken around one's neck. It is well possible to apply any shape of joining parts suitable to the ornamental purpose of the necklace. And, as the engaging members 19, 20 are held to the holders 1, 2 loosely, the necklace itself will not be moved when the joining parts 9, 10 rotate in response to movements of one's neck.

The present invention can be well applied not only to necklaces but also bracelets and other personal ornaments. The joining device of the present invention can be put on so easily and quickly, and is so fine in appearance, that users will be fully satisfied.

What I claim is:
1. A magnetic clasp coupling for jewelry, comprising a pair of opposed magnet holding clasp members each having a flat surface opposed to the flat surface on the other member and each having a recess therein opening out of the flat surface and opposed to the recess in the other member, said recesses each having a substantially flat bottom with a centrally located hollow therein, a magnet in each recess, the magnets each having a flat surface aligned with the flat surface on the clasp member and with the north pole of one magnet at the flat surface of one of the clasp members and the south pole of the other magnet at the flat surface of the other clasp member, and each clasp member having a hole therethrough from said hollow in the bottom of said recess through the clasp member in a direction opposite to the direction in which the recess opens out of the flat face, and an engaging member extending through the hole in each clasp member and having means on the end thereof within said hollow for preventing the engaging member from being withdrawn through the hole and permitting limited pivoting and swiveling movement of said engaging member.
2. A magnetic clasp coupling as claimed in claim 1 in which said clasp members are each substantially cylindrical in shape and have a peripheral flange thereon defining the flat surface and said recesses are cylindrical, and said hollow is spherical, and said engaging members are eye members having a shank extending through the hole in the clasp member and the means on the end of the engaging member is a head on the end of the shank.

References Cited in the file of this patent
UNITED STATES PATENTS
2,288,688    Dubilier _____ July 7, 1942
2,483,031    Avedon _____ Sept. 27, 1949
2,592,395    Cummings _____ Apr. 8, 1952
2,615,227    Hornik _____ Oct. 28, 1952